United States Patent
Nelson et al.

(10) Patent No.: US 7,667,922 B1
(45) Date of Patent: Feb. 23, 2010

(54) ESTIMATION OF BIAS FORCE FOR DATA TRACKING IN A DISK DRIVE

(75) Inventors: Jeff Nelson, Jamestown, CO (US); Jeffrey V. DeRosa, Burlington, MA (US)

(73) Assignee: Seagate Technology LLC, Scotts Valley, CA (US)

(*) Notice: Subject to any disclaimer, the term of this patent is extended or adjusted under 35 U.S.C. 154(b) by 1120 days.

(21) Appl. No.: 11/034,449

(22) Filed: Jan. 10, 2005

Related U.S. Application Data

(60) Provisional application No. 60/534,857, filed on Jan. 8, 2004.

(51) Int. Cl.
*G11B 5/55* (2006.01)
(52) U.S. Cl. .................. 360/78.09; 360/78.04
(58) Field of Classification Search .......... None
See application file for complete search history.

(56) References Cited

U.S. PATENT DOCUMENTS

| | | | | |
|---|---|---|---|---|
| 4,679,103 A * | 7/1987 | Workman | ........... | 360/78.07 |
| 4,697,127 A * | 9/1987 | Stich et al. | ........... | 360/78.09 |
| 5,721,648 A * | 2/1998 | Phan et al. | ........... | 360/78.09 |
| 5,872,674 A * | 2/1999 | Eddy | ........... | 360/78.09 |
| 5,999,361 A * | 12/1999 | Kim | ........... | 360/78.04 |
| 6,166,876 A * | 12/2000 | Liu | ........... | 360/78.04 |
| 6,169,382 B1 * | 1/2001 | McKenzie et al. | ........... | 360/69 |
| 6,324,890 B1 * | 12/2001 | Yeo et al. | ........... | 360/75 |
| 6,738,220 B1 | 5/2004 | Codilian | | |
| 6,760,185 B1 | 7/2004 | Roth et al. | | |
| 6,937,428 B2 * | 8/2005 | Ho et al. | ........... | 360/78.06 |
| 6,937,430 B2 * | 8/2005 | Ge et al. | ........... | 360/78.09 |

OTHER PUBLICATIONS

"Track Follow Integrator Pre-Charge Prediction Utilizing an Averaged Integrator Value," Mar. 1, 1995, IBM TDB TDB vol. 38, No. 3, pp. 273-274.*
Friedland et al. "On Adaptive Friction Compensation" *IEEE Transactions on Automatic Control* 37(10):1609-1612 (1992).
Leonard et al. "Adaptive Friction Compensation for Bi-Directional Low-Velocity Position Tracking" *Proceedings of the 31st Conference on Decision and Control*, Tucson Arizona 267-273 (1992).
Olsson et al. "Friction Generated Cycles" *Proceedings of the 1996 IEEE International Conference on Control Applications*, Dearborn, MI 798-803 (1996).

* cited by examiner

*Primary Examiner*—Mark Blouin
*Assistant Examiner*—James L Habermehl
(74) *Attorney, Agent, or Firm*—David K. Lucente

(57) ABSTRACT

Bias force changes in a disk drive, including transient bias changes, are predicted and/or estimated. Bias compensation or change in bias compensation is calculated based on drive operating parameters such as seek length. Calculation can correspond to a modeled relationship of bias forces to seek length. Preferably, bias compensation calculation is adaptive and calculation parameters can be updated during normal read/write use of the disk drive.

88 Claims, 12 Drawing Sheets

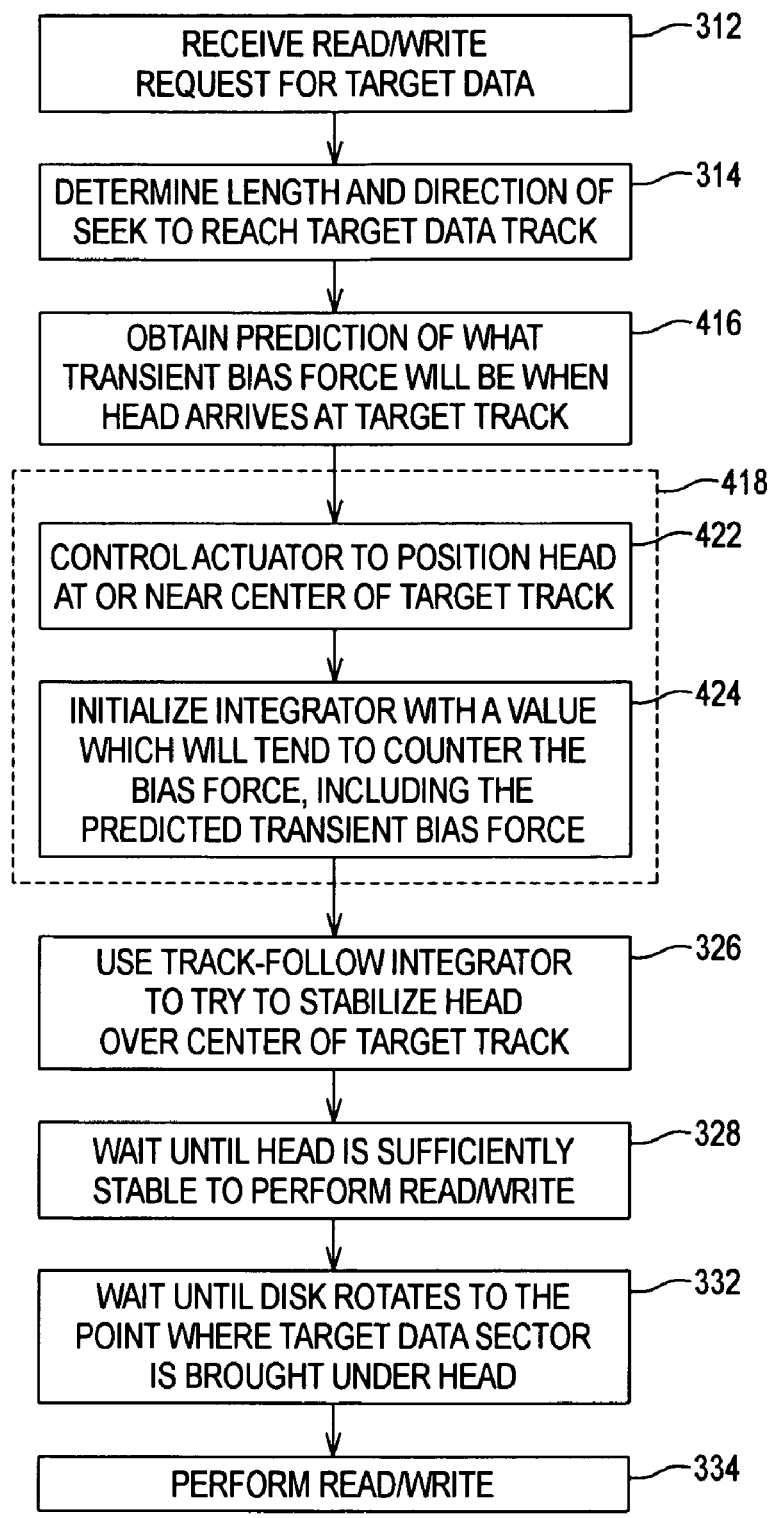

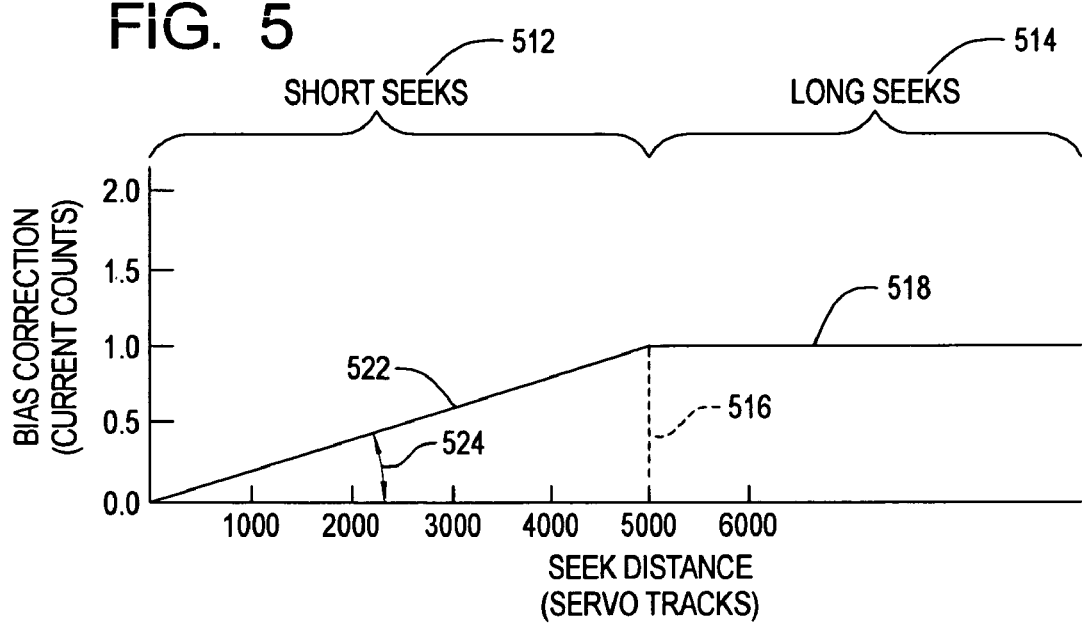
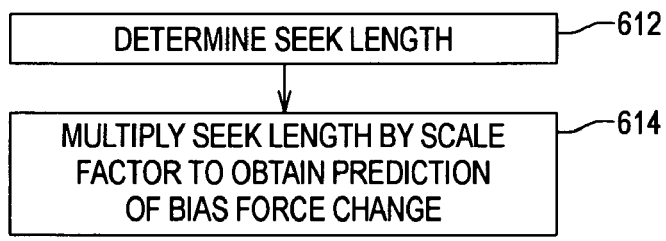

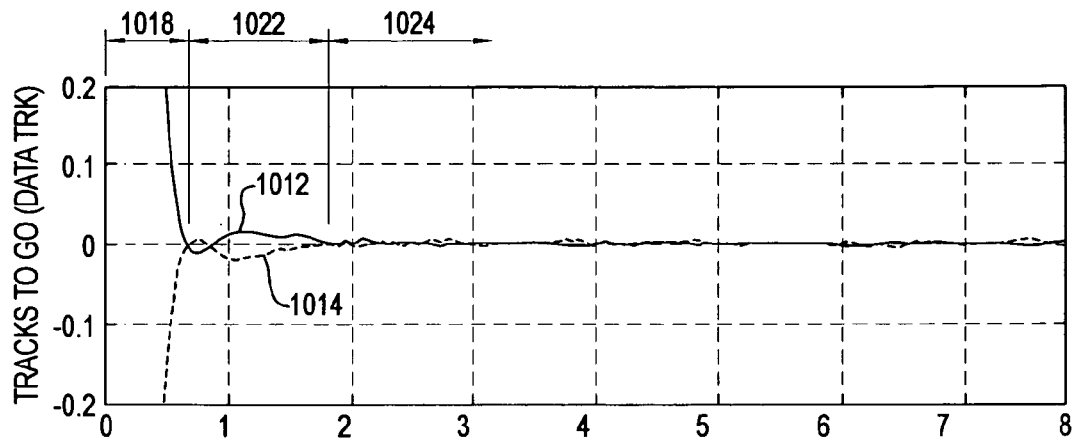
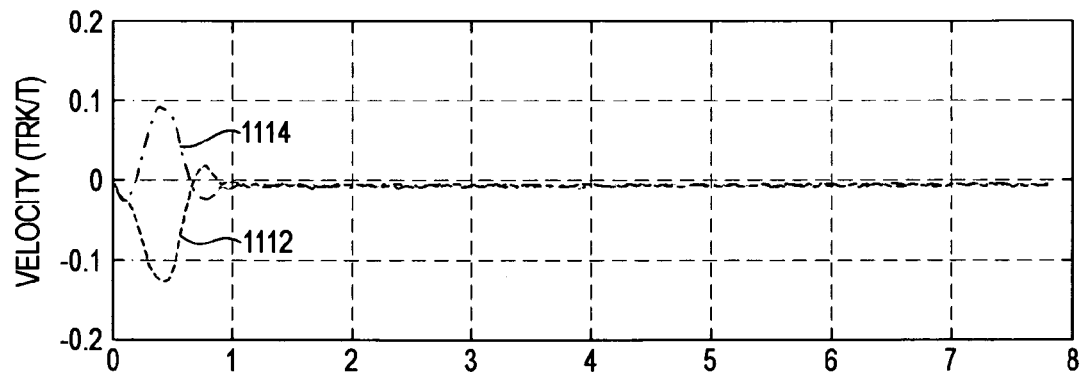
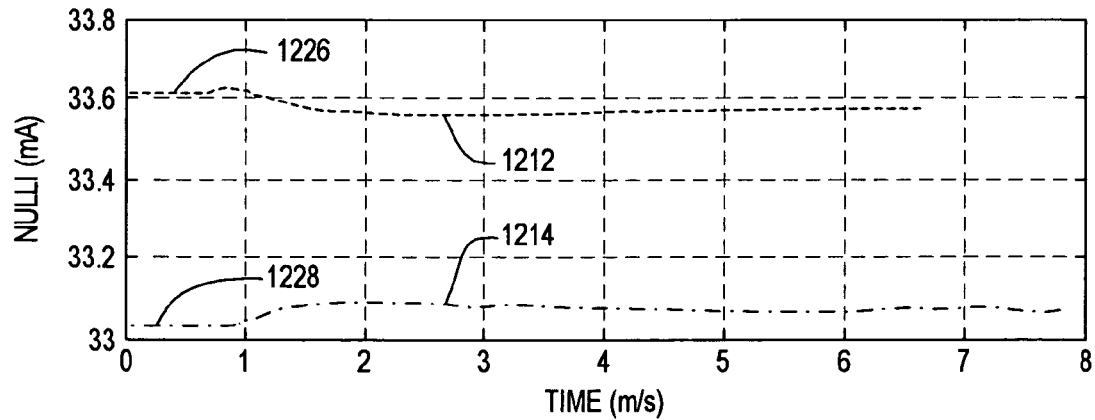

ESTIMATION OF BIAS FORCE FOR DATA TRACKING IN A DISK DRIVE

CROSS-REFERENCE TO RELATED APPLICATIONS

Priority is claimed from U.S. Provisional Patent Application Ser. No. 60/534,857 filed Jan. 8, 2004 entitled "Adaptive Prediction of Bias Force Following Short Seek", which is incorporated herein by reference in its entirety.

FIELD OF THE INVENTION

The present invention is directed to a system, method and apparatus for improving on-track performance of a data-tracking system and in particular which uses an estimate of the total bias force expected following a seek, including short seeks.

BACKGROUND INFORMATION

Data storage devices including, e.g., those normally provided as part of, or in connection with, a computer or other electronic device, can be of various types. In one general category, data is stored on a rotating (or otherwise movable) data storage medium and a read head, a write head and/or a read/write head is positioned adjacent desired locations of the medium for writing data thereto or reading data therefrom. The head may include separate or integrated read and write elements. One common example of a data storage device of this type is a disk drive (particularly the type often called a "hard" disk or "fixed" disk drive).

Typically, information is stored on each disk in nominally concentric tracks, which are divided into sectors. The read/write head (or transducer) is mounted on an actuator arm capable of moving the head to access various radial positions of the disk. Accordingly, the movement of the actuator arm allows the head to access different tracks. The disk is rotated by a spindle motor at a high speed, which allows the head to access different sectors on the disk.

Although many concepts and aspects pertaining to the present invention will be described in the context of a disk drive, those with skill in the art, after understanding the present disclosure, will appreciate that the advantages provided by the present invention are not necessarily limited to disk drives.

In an idealized drive configured with nominally concentric data tracks, if a read/write head is kept a constant radial distance from the (nominal) axis of rotation, there will be no change in the distance (if any) from the read/write head to the desired data track, as the disk rotates. In actuality, however, many factors can contribute to deviations from this ideal condition such that small tracking correction forces must be applied to the read/write head to maintain the head sufficiently aligned with a desired data track as the disk rotates (although some amount of tracking error can be tolerated). Most modern disk drives provide a servo tracking system used for seeking to a target track and/or making tracking corrections to assist in maintaining tracking within acceptable ranges.

Typically, as part of a manufacturing or setup procedure (prior to normal use for data read/write), a hard disk drive is provided with a plurality of servo "bursts." The purpose of these bursts is to provide location information to components of the head-positioning and/or tracking system. The present invention can be used in connection with any of a number of servo burst systems, and those with skill in the art will understand how to use the present invention using any of a number of servo burst systems at least after understanding the present disclosure. Generally, a plurality of servo bursts are positioned around the track. Typically, the bursts are circumferentially aligned, from one track to the next, over at least part of the radial extent of the disk, defining a plurality of servo wedges.

In a typical disk drive system, a disk drive responds to a data read/write request by determining the location of the target data (or, generally, of the initial portion or block of requested data). The location of the target data can be described by the target track, and the target sector, along that track. The disk drive then performs a seek operation intended to position the read/write head over the target track. A number of systems are used for performing seek operations, including those based on monitoring the relative position of the head (e.g., on the basis of the number of "tracks to go") and obtaining appropriate control signals, e.g., from a table (which may be termed "position mode seek") and providing control signals intended to achieve an acceleration, deceleration and/or velocity profile configured to reach the target track (which may be termed "velocity mode seeking"). At the end of the seek operation, the head will be relatively close to the desired center line of the target track and the servo-tracking system is then used for maintaining the read/write head on-track.

Typically, however, after the seek operation, the head will continue to move with respect to the target track center (owing to such factors as seek over-shoot, inherent stiffness in the servo system, and the like) until the tracking system oscillates or otherwise "settles" i.e. the head remains sufficiently (consistently) close to the track center that data read/write operations can reliably proceed. In general, it is desirable to provide a system with a relatively short settling time, e.g., to increase the likelihood that, following the seek operation, disk rotation will bring the target sector under the read/write head in less than one revolution. If the target data is brought, (by disk rotation) past the location of the read/write head during the settling process (i.e., before head radial position is sufficiently stable to permit read/write operations to commence), it will be necessary to wait until the head has settled and then wait an additional period of time required for another (full or partial) revolution of the disk to bring the target sector of the target track under the read/write head. On average, systems having a larger settling time can increase the number of "blown revs" (additional disk revolutions caused by the settling time). Relatively long settling times not only can contribute to undesirably low data throughput or other performance factors during normal operation, but can also contribute to disqualifying entire disk drives during a self-test operation, potentially contributing to a decrease in the effective productivity of a manufacturing line.

In a typical disk-drive system, for any given track location of the read/write head, there will be some amount of lateral force acting on the actuator arm and/or head tending to move the head off-track, which may be referred to as a "bias force." Without wishing to be bound by any theory, there are a number of aspects of a disk drive which may contribute to bias forces, including, e.g., force imparted by a flexure connector, forces associated with actuator arm bearings, windage, the effect of a magnetic latch, and the like.

In a typical disk-drive system, during track-following, the head is maintained on-track by a servo-system which provides current to the voice coil motor having a magnitude and direction configured to maintain the head on-track, despite departure of the track from perfect centricity (including as a result of "runout" and/or bias forces). In at least some configurations, a servo-tracking system monitors the magnitude of the tracking error (e.g., by obtaining the "position error signal" or PES) and calculates the head-positioning control signals which will tend to move the head towards and/or maintain the head at an on-track position. Those with skill in the art will understand various ways of configuring such a servo-tracking system. Thus, for any given target track, the control signal will typically include a component which corresponds to compensating for the bias force, as well as other components such as components corresponding to compensating for runout, and the like.

In at least some configurations, the controller uses information indicative of the general magnitude of the bias component (and/or components) which may be obtained, e.g., from a table of stored values. The controller may combine various components (e.g., bias and runout) and adjust the result of combining these components, on the basis of the PES signal, to arrive at a final track-following signal.

With respect to the bias compensation table, various schemes have been used in attempting to provide appropriate bias compensation values including using tables which are indexed by target track location, recent seek directions, temperature, and the like.

Although previous approaches, including those described herein, have been useful in providing operable tracking systems, it is believed that there remains certain problems and areas for improvement with respect to bias compensation. For example, it is believed that the actual bias force operating on the head includes a transient component, i.e., even though, at two different points in time, or for two different I/O operations, a disk drive may be retrieving the same value from the bias compensation table (e.g., both I/O operations are at the same track, previous seek direction and/or temperature conditions), the actual bias force on the head will differ somewhat from the force that would correspond to the bias compensation value obtained from the table. Thus, actual bias can be considered the sum of a non-transient component (which can be compensated using a table look-up value) and a transient component which may change from time-to-time and which, without wishing to be bound by any theory, may be substantially non-repeating. It is believed that, in general, transient bias forces are induced by movement and can occur even for very short seeks such as one-track seeks (e.g., when the change in a flex lead-induced force would be expected to be small). Without wishing to be bound by any theory, it is believed that substantial bias forces, particularly for small seeks, may be associated with solid friction effects in the actuator arm bearing.

In at least some previous approaches, the non-transient component of bias was dealt with by using a value from a look-up table and the transient component was dealt with by the servo-tracking system. It is believed, however, that relying on the servo-tracking system (to provide compensation for components of bias not handled by the bias compensation table value) contributes to certain undesirable tracking system features such as undesirably long settling time of the tracking system following a seek. In addition, it is believed that large bias force errors can lead to larger-than-expected seek times. Accordingly, it would be useful to provide a system, method and apparatus which can at least partially compensate for transient bias components or other bias force not handled by the bias compensation table system.

Another potential problem with table-based bias compensation is the relative immutability of the table values. Basing bias compensation exclusively on values permanently stored in a table, makes the system unable to adjust to changes in the disk drive that may occur over time (e.g., arising from wear, aging of components, or other factors). Further, those bias force components which change on a relatively rapid time scale, including some or all of the described transient components, may be infeasible to accommodate using a table-based system. Accordingly, it would be advantageous to provide a system, method and apparatus in which at least a component of bias compensation is not based on table values and/or can accommodate changing circumstances, preferably including circumstances which change on a relatively short time scale such as the order of magnitude of the average time between successive seeks.

In at least some previous systems, the track-following servo includes an integrator which, substantially continuously, updates a control signal (typically based on the PES) to maintain the head substantially on-track. In many configurations, it is believed the integrator bandwidth is too low to maintain the head within fine tracking limits when the bias force changes at a high slew rate. In one sense, it is the delta (or change in bias force error from seek-to-seek) which is most problematic, rather than the actual or average magnitude of the error. A large, but relatively constant, bias force error can be learned by the integrator and used for all future seeks, but seek-to-seek changes in bias force error cannot readily be accommodated using table values or other values which are permanently stored (or which change on a relatively long time scale).

In at least some configurations, at the end of the seek operation, the track-following system will operate using an "initial value" in the integrator. In many previous systems, the initial value for the integrator was not well correlated with the control signal being used at the end of the seek operation and, particularly, the component representative of bias. In some configurations, the integrator initial value is left unchanged from the integrator value used in the previous seek. Such configurations are believed to lead to undesirable lengthening of the settling time and to increase the potential for blown revs. Without wishing to be bound by any theory, it is believed that such configurations create a "step" change in the bias force component of the value used by the integrator and that such step changes contribute to undesirable lengthening of settling times. Accordingly, it would be useful to provide a method, system and apparatus which can avoid or reduce step changes or similar occurrences leading to undesirable lengthening of the tracking-servo system settling time, particularly bias force compensation step changes.

SUMMARY OF THE INVENTION

The present invention includes a recognition of the existence, source and/or nature of problems in previous approaches including those described herein.

According to one embodiment of the present invention, bias force compensation is based on, or includes a component which is based on, a calculation using one or more recent operating parameters, rather than, e.g., from a table of stored bias compensation values. In one embodiment, the calculation is based on a model of the relationship of bias force to seek length (the number of tracks traversed during the seek operation which brought the head to the target track). Some models used in embodiments of the present invention provide that the bias or bias compensation is substantially constant as a function of seek length, for seeks greater than a particular seek length ("long seeks"). In one model, short seeks have a bias force compensation (or component thereof) which is a linear function of seek length. In another model, short seeks have a bias compensation (or bias compensation component) which is a parabolic function of seek length. In one embodiment, the model is configured such that the curve defining the relationship of bias compensation to seek length for short seeks intersects the corresponding curve for long seeks at a seek-length value equal to the boundary between long seeks and short seeks.

According to one embodiment of the invention, the system for determining bias compensation is at least partially adaptive (i.e., the system changes in response to recent disk-drive operating parameters). For example, when bias compensation (or compensation components) are based on models as described above, one or more of the parameters defining the models can be adjusted, e.g., in real time such as on the basis of recent PES or other tracking signals. In one embodiment, after the head settles, PES data is used to update the value of the long seek constant bias value or the short seek linear or parabolic equation coefficients.

According to one embodiment of the invention, the control signal used during a seek operation includes a bias compensation component which is preferably gradually changed during the seek operation, so as to reach the estimated or predicted total bias compensation value by the end of the seek process. In this way, a sudden or step change in bias value is avoided.

According to one embodiment, bias force changes in a disk drive, including transient bias changes, are predicted and/or estimated. Bias compensation or change in bias compensation is calculated based on drive operating parameters such as seek length. Calculation can correspond to a modeled relationship of bias forces to seek length. Preferably, bias compensation calculation is adaptive and calculation parameters can be updated during normal read/write use of the disk drive.

BRIEF DESCRIPTION OF THE DRAWINGS

FIG. 4 is a flowchart of a procedure that can be used according to an embodiment of the present invention;

FIG. 5 is a graph of a model of the relationship between seek length and bias, which can be used according to an embodiment of the present invention;

FIG. 6 is a flowchart of a process using the model of FIG. 5, according to an embodiment of the present invention;

FIG. 10A is a graph showing a trajectory of a seek, settling and tracking process according to previous approaches;

FIG. 11A is a graph showing velocities for a seek, settling and tracking process according to previous approaches;

FIG. 12A is a graph showing nulli values for a seek, settling and tracking process according to previous approaches;

DETAILED DESCRIPTION OF THE PREFERRED EMBODIMENT

Figure 1:
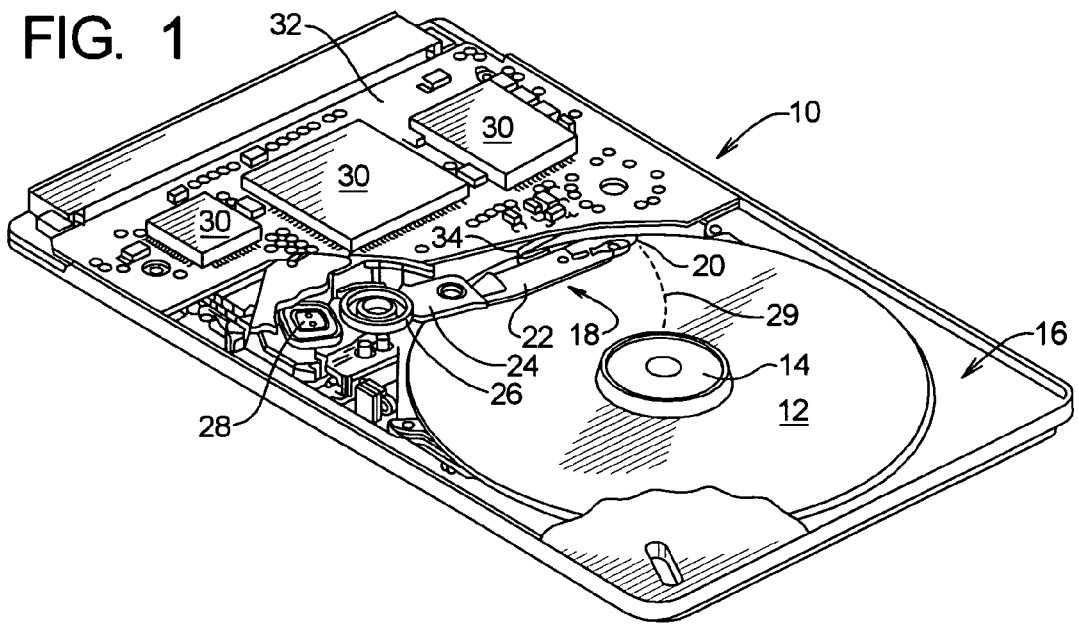
FIG. 1 is a simplified, partially broken-away, perspective view of a disk drive that can be used in embodiments of the present invention.

A disk drive 10 is illustrated in FIG. 1. The disk drive comprises a disk 12 that is rotated by a spin motor 14. The spin motor 14 is mounted to a base plate 16. The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 along arcuate path 29, relative to the disk 12. The spin motor 14, voice coil motor 28 and head 20 are coupled to a number of electronic circuits 30 mounted to a printed circuit board 32. In some configurations, the coupling includes a ribbon-like flexure connection 34 having a plurality of conductive traces. The electronic circuits 30 typically include a read channel chip, a microprocessor-based controller and a random access memory (RAM) device. Instead of a one disk configuration (shown in FIG. 1), the disk drive 10 may include a plurality of disks 12 and, therefore, a plurality of corresponding actuator arm assemblies 18.

Figure 2:
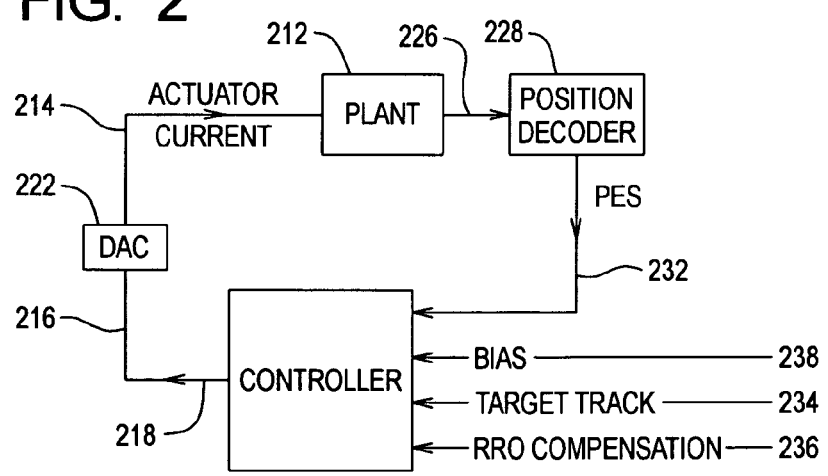
FIG. 2 is a block diagram of a control system which can be used as a tracking-servo system, according to an embodiment of the present invention.

FIG. 2 illustrates, in block-diagram form, certain components of a control system which can be used as a tracking-servo system according embodiments of the present invention. Typically a tracking-servo system uses a disk drive microprocessor controlled by firmware, although other approaches are at least theoretically possible including the use of application-specific integrated circuits (ASIC's), hard-wired and/or discrete component devices and the like. Those of skill in the art will understand how to design, select, construct, program and/or use microprocessors or other circuitry to implement the present invention, at least after understanding the present disclosure.

In the configuration of FIG. 2, the plant 212 which can include, e.g., the voice coil motor, receives actuator current 214, which may be obtained by converting digital control signals 216, output by a controller 218 (which may include a microprocessor or the like) using a digital-to-analog converter (DAC) 222. The plant 212 outputs a position signal 226 which is decoded by a position decoder 228 to provide the position error signal 232 indicative of any discrepancies from ideal tracking. The controller 218 determines the control signal 216 based on some or all of a number of inputs including, in addition to PES 232, an input indicating the target track 234, an input relating to repeatable runout compensation 236 and input indicative of a bias force or a bias compensation value 238. As noted above, in previous approaches, bias compensation values were typically obtained from a stored table.

Figure 3:
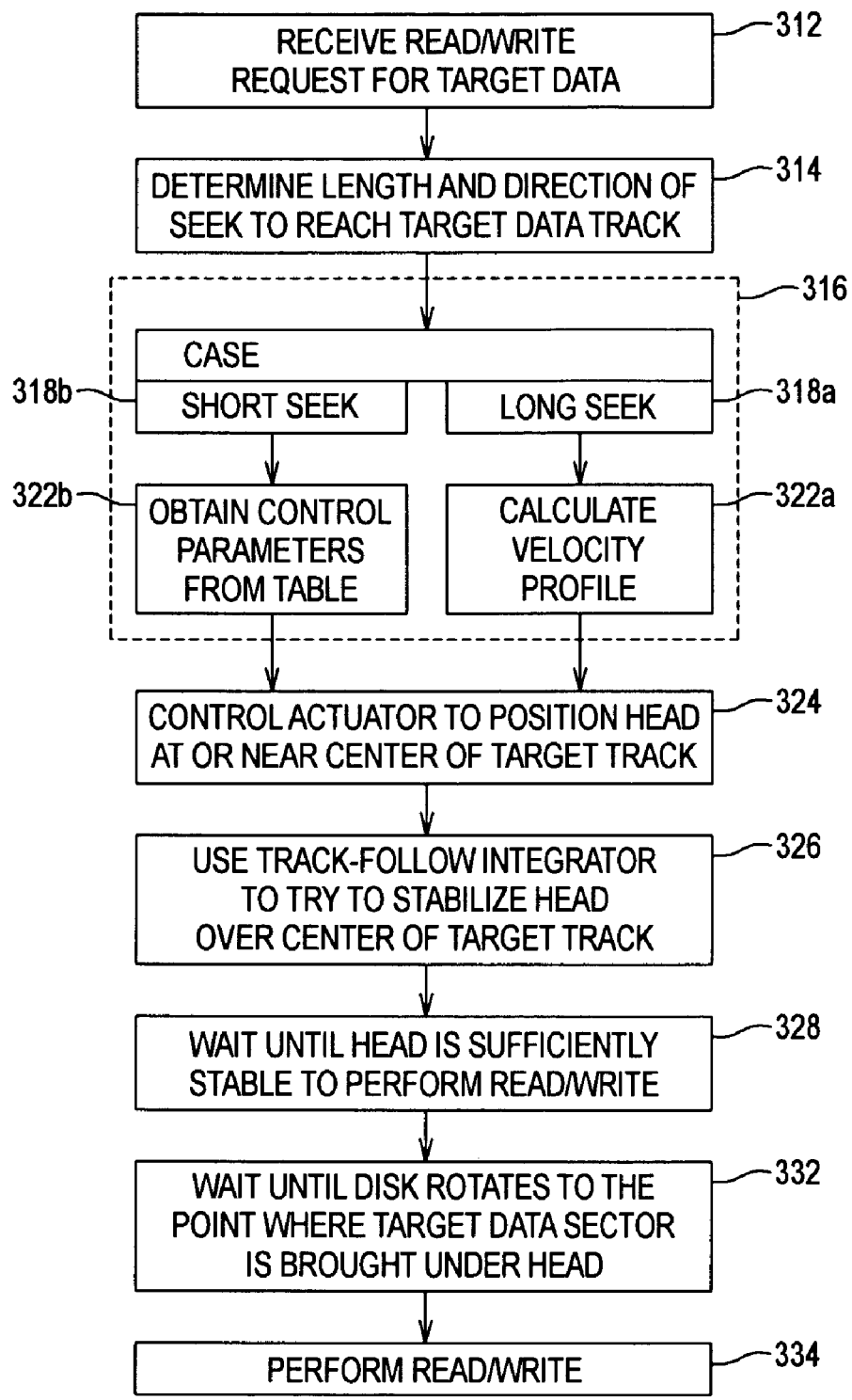
FIG. 3 is a flow diagram of a seek and track following process, according to a previous approach.

FIG. 3 illustrates, in flow diagram form, one approach to seeking and track-following particularly as it relates to the bias component, according to previous approaches. The controller receives a read/write request for a particular target data 312. Using this information, and the information indicative of current head position, the controller can determine the length and direction of the seek which will be required to reach the target data track 314.

In the depicted configuration, the controller then obtains information which can be used to provide the control signals needed during the seek process 316. In the depicted configuration, the controller determines whether the seek length is below a particular partition value or above that value and, on this basis, whether the seek is a long seek 318a or a short seek 318b. The particular number used as the partition or boundary between a long seek and a short seek will generally be a constant for any given model of disk drive and can be in the range, for example, of a few hundred to a few thousand tracks.

In the depicted configuration, long seeks are conducted, using a velocity mode approach by calculating a velocity profile 322a. Short seeks are performed using a position mode approach, involving obtaining control parameters from a table 322b. The controller, using these procedures, outputs a series of control signals configured to control the actuator so as to move or position the head at or near the center of the target track 324. The controller then operates as a tracking-servo system, using the track-follow integrator (or the software equivalent thereof) in an attempt to stabilize the head at a position over the center of the target track 326. The tracking-servo system continues to operate until the head is sufficiently stable (remains sufficiently constantly near the center of the target track). After the head has "settled" (and while the tracking-servo system continues to operate), the system must still wait until the disk rotates to the point at which the target data sector is brought under the read/write head 332, at which point the system can perform the requested read/write operation 334.

FIG. 4 illustrates a procedure that can be used in accordance with an embodiment of the present invention. In the embodiment depicted in FIG. 4, the initial steps 312, 314 and final steps 326, 328, 332, 334, can be substantially the same as those depicted in FIG. 3. In the embodiment of FIG. 4, however, after determining the length and direction of the seek, the controller will obtain an estimate or prediction of what the bias force, including transient components of the bias force, will be when the head arrives at the target track 416. The controller will use the estimation or prediction of transient bias force in outputting various control signals 418. In the depicted embodiment, the controller uses the bias force estimate or prediction to position the head at or near the center of the target track 422 and preferably initializes the integrator with an initial value which will tend to counter the actual bias force, including the predicted or estimated transient bias force, once the head has reached the target track 424.

In one embodiment, the estimate or prediction of bias force or bias correction is based on a model of the relationship of bias correction to seek distance. FIG. 5 is a graph illustrating one such model according to an embodiment of the present invention. In the graph of FIG. 5, the partition or boundary between short seeks 512 and long seeks 514 is a seek distance of 5,000 tracks 516. For long seeks, according to FIG. 5, the bias correction is substantially constant 518 (i.e., is the same for all seek distances greater than 5,000 tracks). For short seeks 512, the bias correction is a linear function of the seek distance 522 with the angle or slope 524 (which can be termed a "scale factor") representing the relationship between seek distance and bias correction. This model can be expressed as:

$$\left. \begin{array}{l} BC = Sx, \text{ for } x < P \\ BC = C, \text{ for } x \geq P \end{array} \right\} \quad (1)$$

where: $BC$ = calculated bias correction;

$S$ = scale factor;

$x$ = seek length;

$P$ = partition between short and long seeks; and, $C$ = constant bias correction for long seeks.

The value of P, (the partition or boundary between short and long seeks) for purposes of bias correction can be set equal to, but need not be equal to, the same boundary used for distinguishing short and long seeks 318a, 318b, for purposes of determining seek mode.

Using the model of FIG. 5, the step of predicting bias force (or the change therein), or bias force correction (or the change therein) 416 can be performed as shown in FIG. 6. According to the process of FIG. 6, after determining the seek length 612, the seek length is multiplied by the scale factor to obtain a prediction of bias force change 614. With regard 614, the (signed) result of this multiplication is added to the current integrator value to yield predicted integrator value at the end of the seek. In one embodiment, the procedure of FIG. 6 is used only for short seeks, while a constant value is used for long seeks, as shown in equation (1). It is possible, however, to also provide embodiments in which the procedure of FIG. 6 is used for substantially all seeks.

Figure 7:
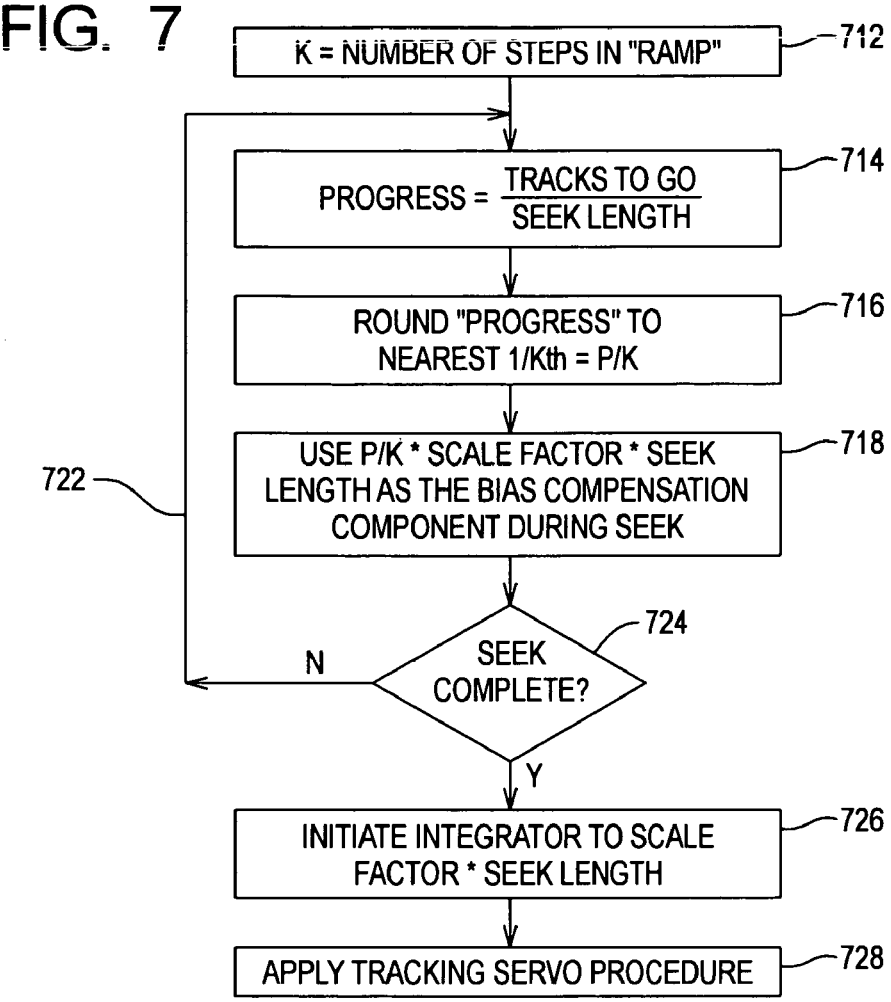
FIG. 7 is a flowchart of a procedure that can be used according to an embodiment of the present invention.

Returning the embodiment of FIG. 4, after the bias correction estimate is obtained 416, a seek is performed and the actuator is controlled to position the head at or near the center of the target track 422. In one embodiment, the bias compensation prediction is used during the seek operation. The embodiment of FIG. 7 depicts a procedure which will gradually change at least the bias component of the control signal during the seek process so that a step change in the value used by the integrator of the servo-tracking system is eliminated or reduced. The procedure of FIG. 7 provides a generally linear increase or ramp-up of the bias component during a seek. In the embodiment of FIG. 7, the ramp-up is done in a stair-step fashion rather than a strictly continuous fashion. In the embodiment of FIG. 7, K represents the number of steps provided in the ramping-up 712. "Progress" is defined as the remaining tracks in the seek ("tracks to go") divided by the seek length 714. This ratio is rounded to the nearest 1/Kth value to produce the fraction P/K 716. The controller can then output, as the bias compensation component during the seek operation, a value equal to P/K times the scale factor, times the seek length 718. For example, if K-steps are used for the ramp, when the head has moved through, for example, ⅝ths of the seek distance, "progress" will be equal to ⅝ths and, after rounding to the nearest 1/10th, P/K equals 6/10. Accordingly, at this point during the seek, the controller will be outputting control signals using a bias compensation value equal to 6/10ths of the total estimated or predicted bias compensation.

This process continues 722 until the seek is complete 724. At this point, the integrator of the servo-tracking system is initialized to an initial value corresponding to, or taking account of, the estimated or predicted bias compensation, i.e., the scale factor times the seek length 726, at which time normal tracking-servo procedures can be applied 728.

In at least some embodiments of the invention, parameters or other values used in computing bias compensation, are updated, continuously or periodically, during normal operation of the disk drive. In the embodiment shown in FIG. 8, information used for updating is obtained during on-track operation (e.g., after the head has settled). In the embodiment depicted in FIG. 8, the process waits until the head is sufficiently stable to perform normal read/write operations, i.e., the head position has settled 812. The position error signal (or similar signal) is summed, averaged or integrated over a period of time, such as over N sectors. In one embodiment, N equals 25 although various values for N can be used in embodiments of the present invention. The integrated PES provides a rolling average. The integrated error signal is used to update the scale factor 816. The adaptation rate has been found sufficient in at least one embodiment, for the scale factor to reach steady state in approximately 20 to 30 consecutive seeks. The updated scale factor is stored 818 for use in future procedures such as the procedure of FIG. 6.

Figure 8:
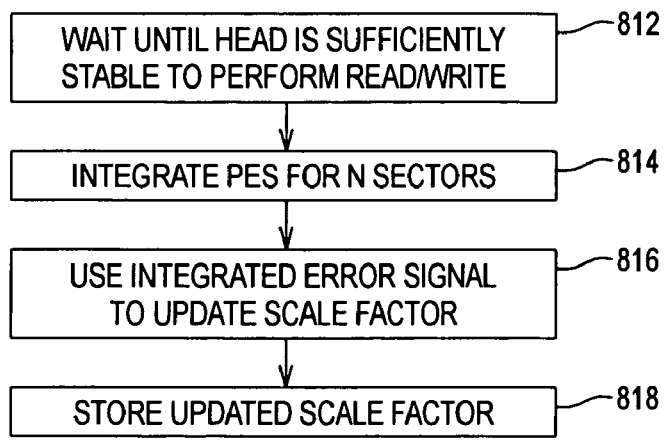
FIG. 8 is a flowchart of a procedure that can be used according to an embodiment of the present invention.

It is possible to provide storage of a plurality of scale factors for use in different circumstances such as a table of scale factors indexed by track location or radial zone, short or long seek category, seek direction history, ambient temperature and the like, or a combination thereof. However, unlike previous approaches using, e.g., a predetermined and stored table of bias values, the procedure of FIG. 8 provides for continuous or periodic updating of values used in calculating bias compensation, during normal read/write operation of the disk drive.

Figure 9:
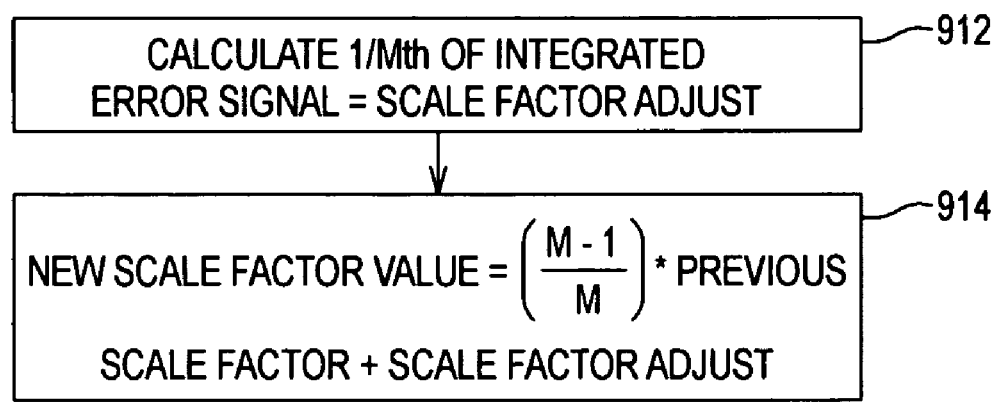
FIG. 9 is a flowchart of a procedure that can be used according to an embodiment of the present invention.

A number of procedures can be used for updating the scale factor based on the integrated error signal 816. For example, in the procedure shown in FIG. 9, a "scale factor adjust" value is calculated as 1/Mth of the integrated error signal 912 and the scale factor is updated by calculating the new scale factor as being equal to (M−1/M) times the previous scale factor, plus the calculated "scale factor adjust" 914.

Figure 10B:
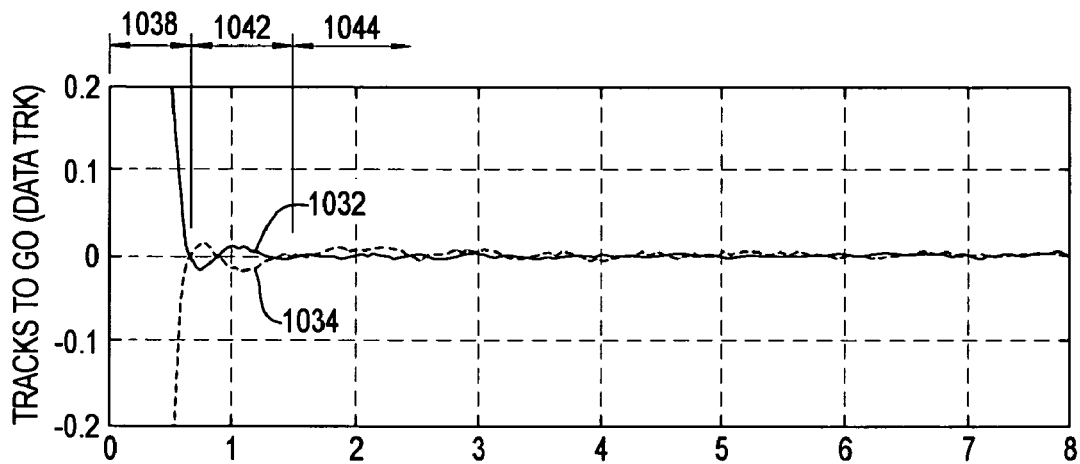
FIG. 10B is a graph showing a trajectory of a seek, settling and tracking process, according to an embodiment of the present invention.

FIGS. 10-12 provide a comparison of data obtained using previous approaches to data obtained using the approaches of FIGS. 4-9. In FIGS. 10-12, the horizontal axis represents time in microseconds. FIG. 10A shows inward direction 1012 and outward direction 1014 trajectories (expressed in terms of "tracks-to-go") for a seek 1018, settling 1022 and normal tracking 1024 process using previous approaches. Corresponding inward direction and outward direction trajectories 1032, 1034, respectively, for a seek 1038, settling 1042 and tracking 1044 process according to the embodiment of FIGS. 4-9 is shown in FIG. 10B. The comparison shows that the settling time 1042 according to the present invention is substantially smaller than the settling time 1022 of previous approaches, in at least the examples shown in the figures.

Figure 11B:
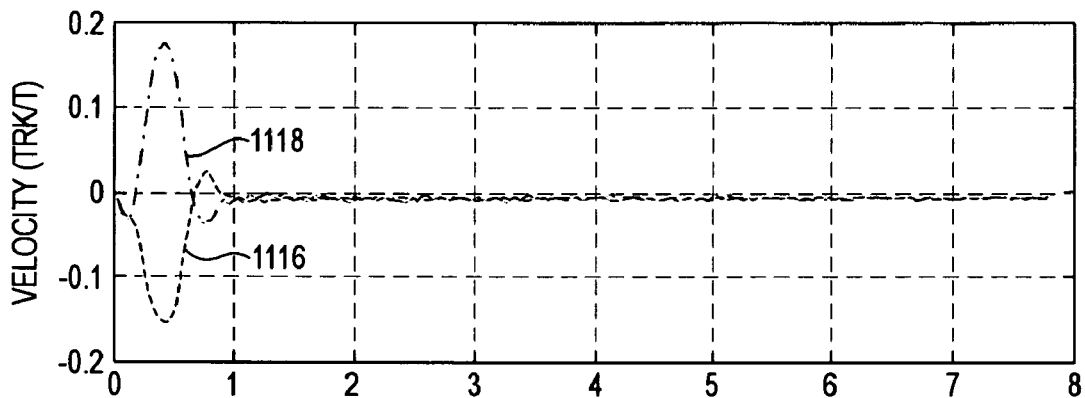
FIG. 11B is a graph showing velocities for a seek, settling and tracking process, according to an embodiment of the present invention.
Figure 12B:
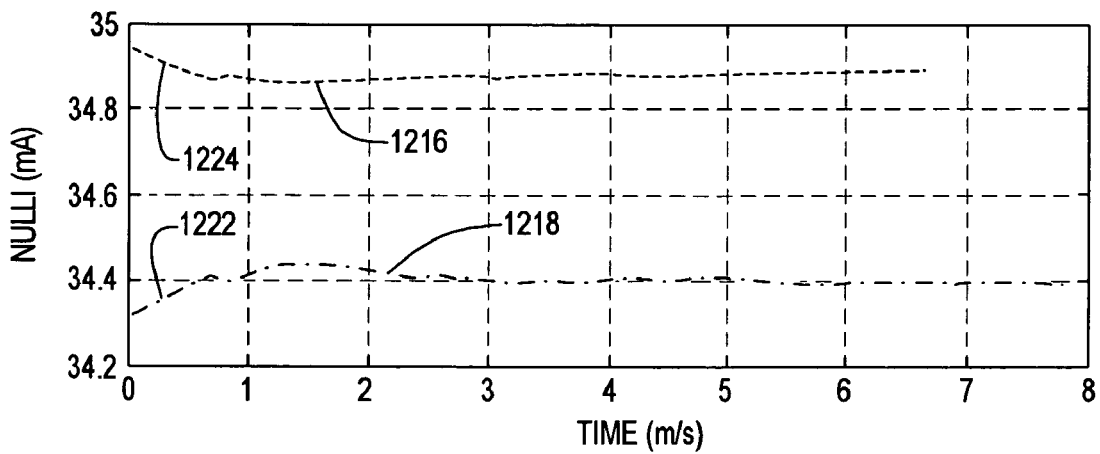
FIG. 12B is a graph showing nulli values for a seek, settling and tracking process, according to an embodiment of the present invention.

Similar rapid settling using an embodiment of the present invention can be seen from the inward direction and outward direction average velocity profiles (expressed as tracks-per-unit time) for previous approaches 1112, 1114 (FIG. 11A) and inward direction and outward direction velocity profiles for a process according to an embodiment of the present invention 1116, 1118 (FIG. 11B). FIGS. 12A and 12B provide a comparison showing the average null current ("nulli") value in milliamps (generally indicative of the integrator value) for an inward direction 1212 and outward direction 1214 process according to previous approaches and an inward direction 1216 and an outward direction 1218 process using an embodiment of the present invention. FIG. 12B also illustrates how the integrator value can be ramped 1222, 1224 during seek periods, as opposed to having a constant value 1226, 1228 as shown in FIG. 12A.

Figure 13:
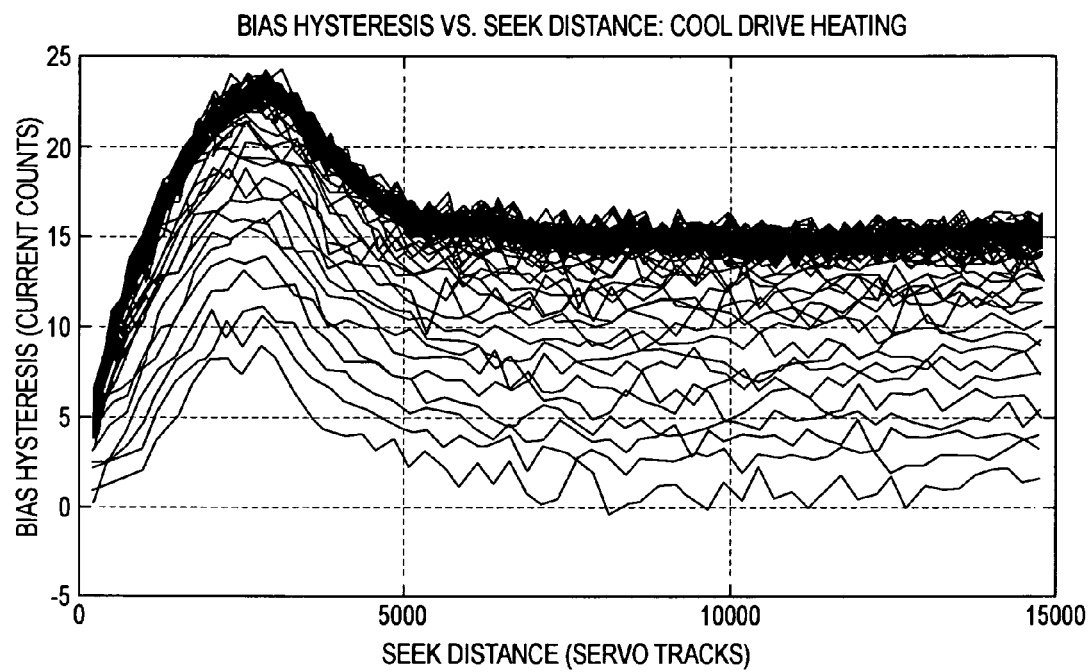
FIG. 13 is a graph showing measured values of bias hysterisis as a function of seek distance for a plurality of test runs.

As noted above, the embodiment of FIGS. 4-9 can based on a model in which bias is a linear function of seek distance, at least for short seeks, e.g., as shown in FIG. 5. FIG. 13 is a graph showing measured values for bias hysterisis (expressed as current counts) as a function of seek distance for a plurality of tests run over a period of time, as the ambient temperature of the disk drive increased. In general, curves near the bottom of the graph in FIG. 13 represent cooler temperatures and curves near the top represent higher temperatures. FIG. 13 not only indicates that the relationship of bias hysterisis changes with temperature, but also shows that, while long seeks (e.g., greater than 5,000 servo tracks) are roughly constant (at a given temperature) as a function of seek distance, short seeks have a graph which is generally concave downward.

In one embodiment of the invention, a model somewhat different from the model of FIG. 5 is used for bias correction calculation. For example, in the illustration of FIG. 14, while bias correction for long seeks 1412 (e.g., greater than 5,000 tracks) is constant as a function of seek distance, short seeks are modeled by a curve having a generally parabolic shape 1416. A model of this nature can be expressed by equation (2):

$$\left.\begin{array}{l} BC = Ax_i + Bx_i^2 \text{ for } x < P \\ BC = C, \text{ for } x \geq P \end{array}\right\} \quad (2)$$

where: $A$ and $B$ are curve-defining coefficients; and, $x_i$ = seek length / P (scaled seek length).

In some approaches, a distinction is made between bias values for seeks in an inward direction (a direction towards the rotation axis of the disk), and outward direction (a direction towards the outer diameter of the disk). This approach is used to reflect the often-observed "hysterisis", i.e., in which the behavior of a system which is otherwise identical, differs depending upon the direction of approach. Although the following discussion will generally be in terms of bias values and bias correction values or components, those of skill in the art will understand that embodiments of the present invention are also applicable with regard to bias hysterisis components or corrections.

In general, it is believed preferable that the model should be constructed to avoid step-discontinuities in the model. In particular, unless care is taken, there could be a step-discontinuity in the correction curves at the seek distance 1422 which defines the "partition" between a long seek and a short seek. Accordingly, in one embodiment the model is constructed such that the point 1418 where the short bias correction curve 1416 intersects the long seek constant value 1412 occurs at such position. As will be understood by those of skill in the art, there are several ways in which such a model can be constructed. In one embodiment, values are determined for the magnitude (C) 1424 of the long seek portion of the curve and the magnitude (M) 1426 of the mid-point (i.e., P/2) of the short seek portion of the curve, and these values are then used to calculate coefficients A and B, e.g., according to equation (3):

$$A = \frac{1}{P}(4M - C)$$
$$B = \frac{C}{P^2}(P^2 - 4M - 1)$$
(3)

where: $M$ is the magnitude of the midpoint of the short seek curve.

The approach of equation (3) is believed to be especially useful at least because, by choosing the midpoint of the short partition to adapt, the processing which is required to achieve the common intersection 1418 is reduced, since it is possible to replace some or all multiplication operations with (computationally less expensive) shift left and/or shift right operations.

Figure 14:
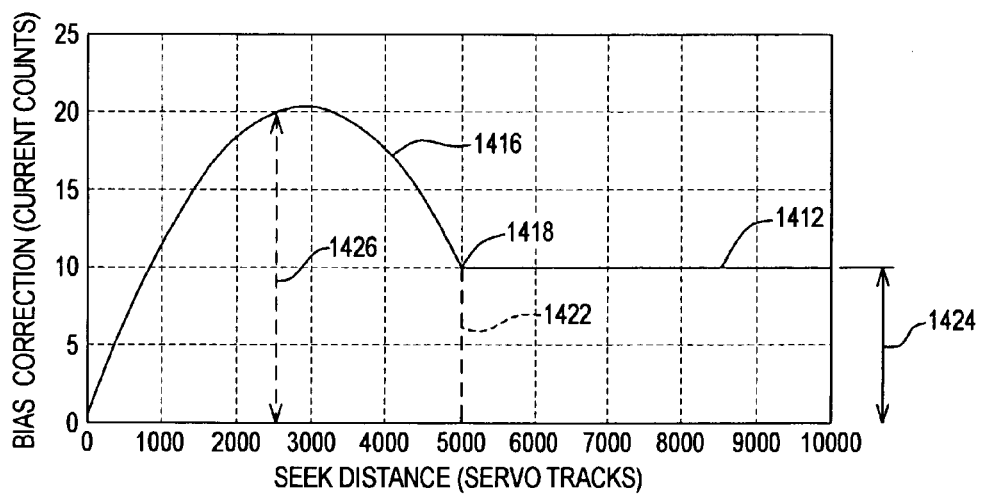
FIG. 14 is a graph of a model of the relationship between seek length and bias, which can be used according to an embodiment of the present invention.
Figure 15:
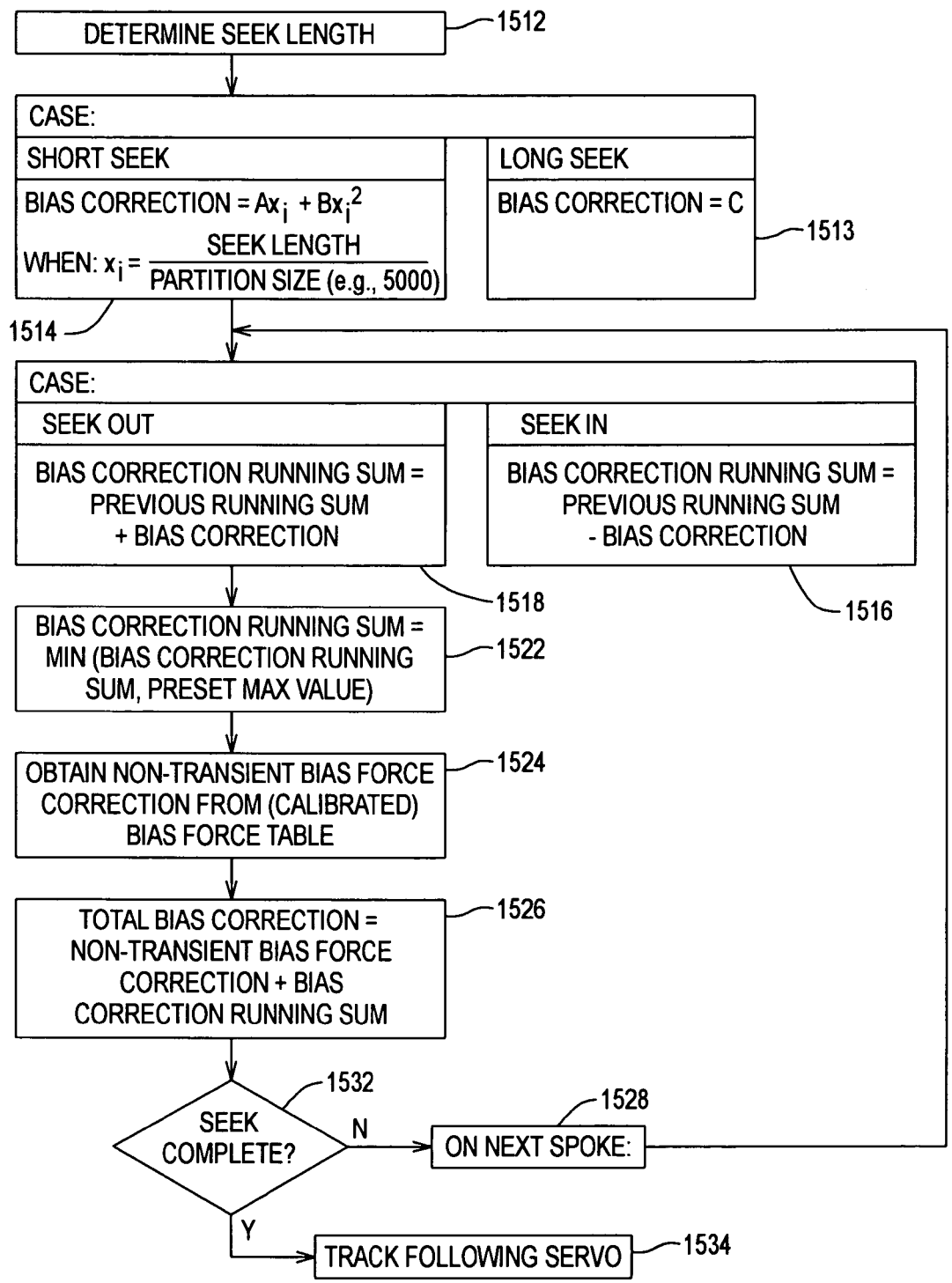
FIG. 15 is a flowchart of a process using the model of FIG. 14, according to an embodiment of the present invention.

FIG. 15 is a flowchart showing a procedure which can be used, according to an embodiment of the present invention, to implement the model of FIG. 14. After determining the seek length 1512, the bias correction will be set equal to the constant C 1513 or will be determined as a parabolic function of the (scaled) seek length 1514 for a short seek (in accordance with equation (2)). The bias correction determined in steps 1513, 1514 are delta corrections, i.e., corrections which are combined with the previous bias correction values.

In the embodiment of FIG. 15, bias correction BC is subtracted from the previous running sum "PRS" to obtain the new bias correction running sum "BCRS" 1516 for a seek in an inward direction, but is added to the previous running sum 1518 for the seeks in the outward direction. Since the delta correction can be cumulative in nature, it is possible successive additions of the bias correction 1518 (e.g., resulting from a number of successive outward seeks) may increase the bias correction running sum to an undesirable magnitude. Accordingly, in the depicted embodiment, the bias correction running sum is limited to a maximum preset value 1522. In the embodiment depicted in FIG. 15, the bias correction running sum is added 1526 to a non-transient bias force correction, e.g., obtained from a (preferably calibrated) bias force table (previously stored) 1524, to provide a total bias force correction. The bias force correction is calculated on every spoke 1528 until the seek is complete 1532, at which time the track-following servo 1534 begins normal operation.

As with the embodiment of FIG. 4, the embodiment of FIG. 15 can also be implemented in a fashion which provides adaptation. For example, in the approach illustrated in the flowchart of FIG. 16, data obtained during selected track-following operations are used to update values for C (the constant bias correction value for long seeks) and M (the magnitude of the short seek curve mid-point) and these values are used, in turn, to calculate A and B (e.g., using equation (3)).

Figure 16:
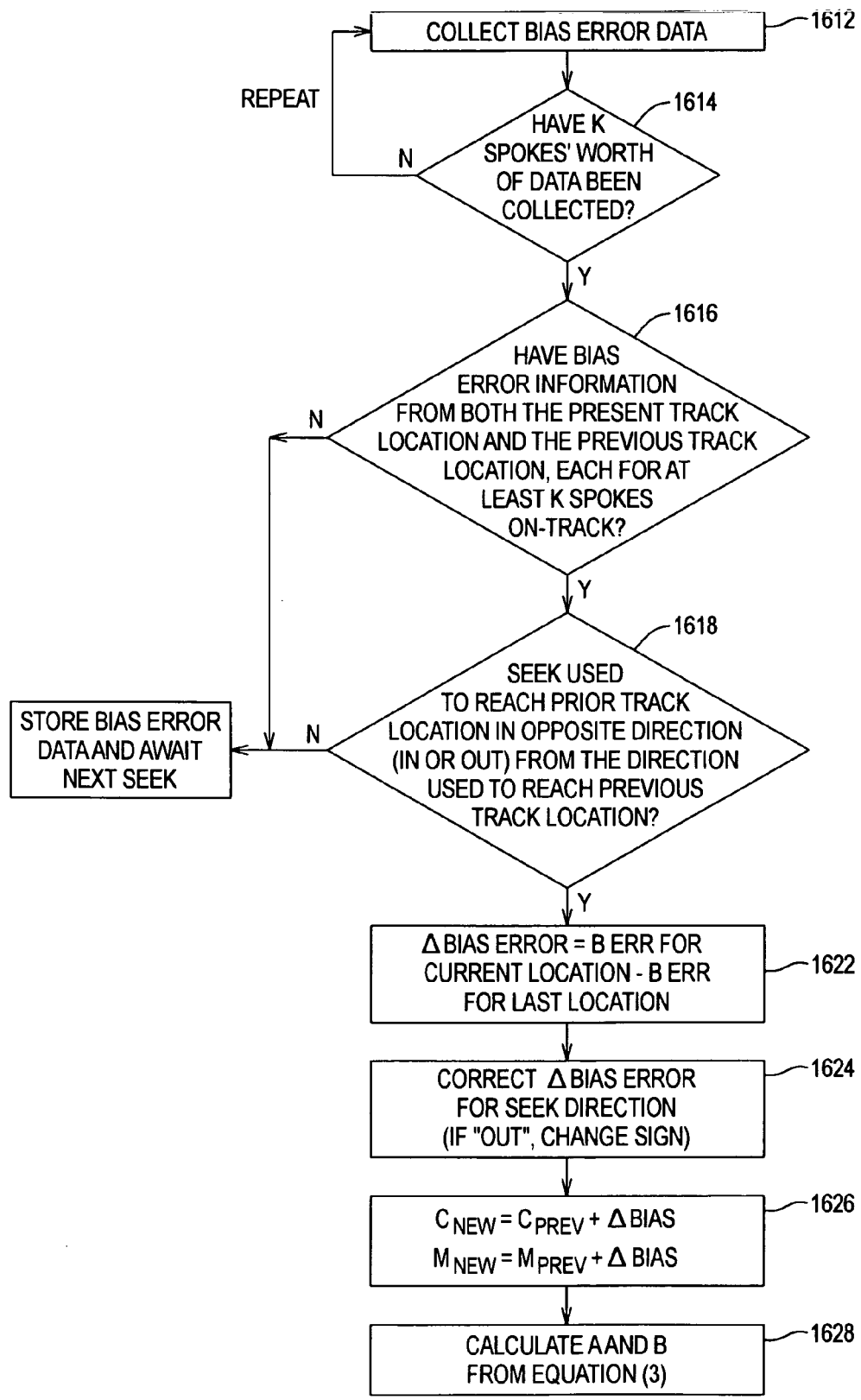
FIG. 16 is a flowchart of a procedure that can be used according to an embodiment of the present invention.

In the procedure of FIG. 16, during on-track periods, bias error data is collected. Such on-track data collection is continued, as each spoke of a track passes under the read-write head, until a pre-specified amount of such data has been collected 1612. In one embodiment, data collection is repeated for successive accessed tracks 1614 until both of two conditions have been met: (1) that there is sufficient (K spokes) on-track bias error data for each of at least the present track location and the previous track location 1616; and, (2) the seek used to reach the present track location is opposite in direction (i.e., inward or outward) from the direction used to reach the previous track location 1618. The magnitude of K (as well as need to fulfill conditions 1616 and 1618) means that a certain amount of time is required to obtain an estimate of bias force error. In general, procedures which can improve the accuracy of the estimate also increase the time requirements, potentially exceeding computing resources and/or time available. At this point, the delta bias error is calculated as the collected bias error for the current location minus the bias error for the last bias location 1622. The delta bias error is corrected for seek direction (i.e., the sign is changed if the seek direction for the current location was "outward"). The delta bias error is then added to the previous values for C and M to obtain the new values for C and M 1626. New values for A and B are then calculated (using equation (3) or the equivalent) 1628.

Figure 17A:
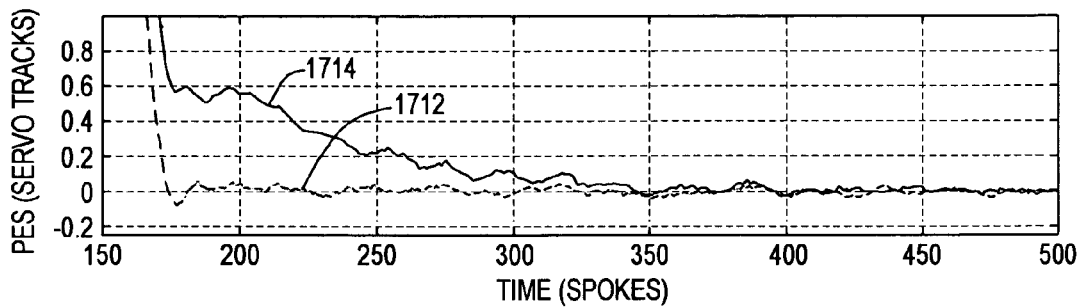
FIG. 17A is a graph showing the time behavior of the position error signal for a previous approach and an embodiment of the present invention.
Figure 17B:
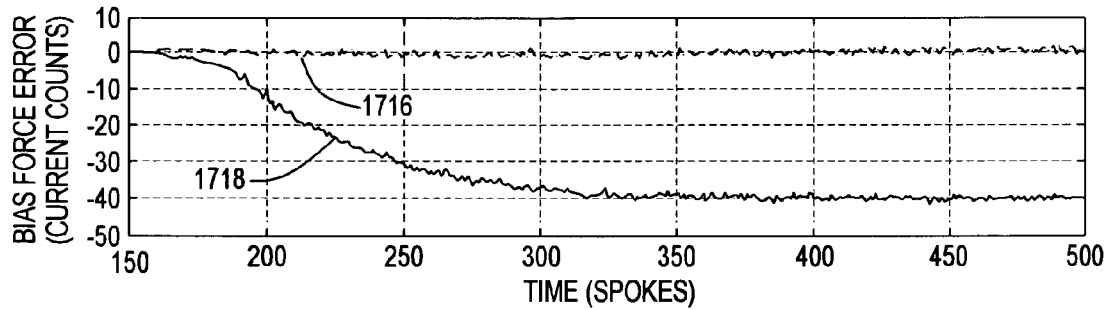
FIG. 17B is a graph showing the time behavior of bias force error for a previous approach and an embodiment of the present invention; and, FIG. 18 is a graph illustrating an example of the effect of adaptation, according to an embodiment of the present invention.

FIG. 17A provides examples of the time behavior (expressed in terms of servo spokes) of the PES signal (in units of servo tracks), using substantially the embodiment of FIG. 16 1712, and previous approaches 1714. FIG. 17B shows corresponding time behavior of the bias force error (expressed in current counts) for the same example, using an embodiment of the present invention 1716 and previous procedures 1718. FIGS. 17A and 17B illustrate the substantially more rapid settling of the head with respect to the target track using an embodiment of the present invention.

Figure 18:
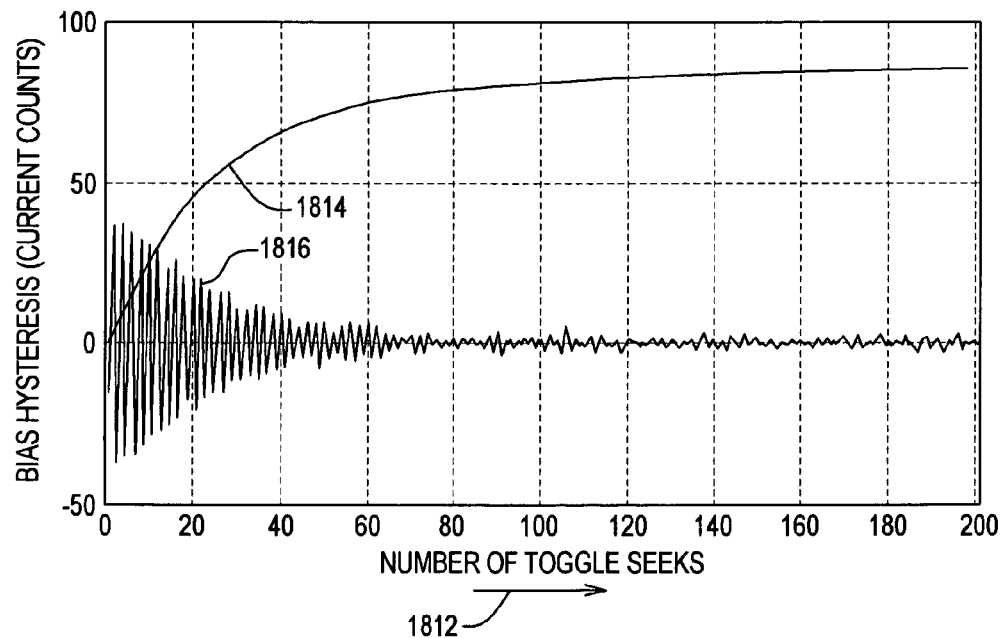

FIG. 18 illustrates an example of the effect of adaptation, using substantially the embodiment of FIG. 16. As the number of seeks performed increases 1812, the value of the bias correction changes 1814, eventually approaching a substantially steady value. Although the bias correction 1814 is shown as beginning from a value of zero, it is also possible to provide embodiments in which other starting values are used for adaptation such as values measured and calculated and/or stored during the manufacturing/testing process prior to normal use. The effect of the adaptation value 1814 can be seen in the plot of the actual bias error 1816 (which is uncorrected for seek direction). As shown in FIG. 18, in this example, the algorithm drives the error 1816 relatively close to zero in about 50 seeks.

In general, it is expected that, using bias correction procedures, e.g., according to FIG. 15, it is possible to increase the effective number of read/write operations per second and decrease the number "blown revs" during normal read/write operations.

A number of variations and modifications of the invention can be used. It is possible to use some features of the invention without using others. For example, it is possible (although not necessarily optimal) to provide for calculated, rather than table-based, bias correction without providing adaptation and/or without ramping the integrator value during the seek. Similarly, it is possible to provide an adaptive bias correction without using the ramped integrator value or without using seek-length-dependent models, e.g., as described herein. Although procedures have been described in connection with embodiments of the present invention, it is possible to implement embodiments of the present invention using different procedures including procedures which have more or fewer steps or in which steps are performed in an order different from that shown. Those of skill in the art will understand how to implement embodiments of the present invention, whether by a firmware-controlled microprocessor or otherwise, at least after understanding the present disclosure.

Various approaches can be used for resetting the scale factor at various times, such as after a velocity mode or long search, including resetting to zero, resetting to a stored average value, and the like. Various approaches can be used regarding a manner for initializing the scale factor, e.g., following a "power-on reset" such as initializing scale factor to zero or initializing to a pre-stored average value.

Although the procedure of FIG. 15 is different depending upon the seek direction 1516, 1518 while the procedure of FIG. 4 does not contain such a distinction, it is possible to provide different procedures or values for inward or outward seeks or to forego such distinction, in either the procedure of FIG. 4 or the procedure of FIG. 15.

Although models have been described in which a constant bias correction (as a function of seek length) is used for seek lengths greater than a given value, it is also possible to use embodiments of the present invention in the context of models which provide non-constant relationships to seek length, for larger seeks.

Although the present invention has been described in the context of a disk drive having a servo-tracking system, the present invention can be used in connection with any of a variety of different servo-tracking configurations.

Although the present invention has included a description of adaptation in which the long seek constant, short seek scale factor or short seek curve coefficients are adapted, it is also possible to provide for adaptation of other items including, e.g., the value of the partition P, the value of the preset maximum, the value of steps in the ramp K (712), the weighting factor N for updating scale factor, and the like.

In light of the above discussion, a number of advantages of the present invention can be seen. The present invention can provide an average reduction in seek times and/or settling times. The present invention can improve average data throughput. The present invention can reduce the percentage of drives which are disqualified in a testing procedure. The present invention can accommodate transient forces, including transient bias forces of disk drives. The present invention can provide at least partial adaptation to changes which can occur in the disk drive over a range of time including adaptation on a seek-to-seek time scale as well as adaptations substantially over the lifetime of a disk drive. At least some embodiments of the present invention can be implemented by changing substantially only software or firmware, i.e., without the need for hardware changes.

The present invention, in various embodiments, includes components, methods, processes, systems and/or apparatuses substantially as those depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus, comprising:
   circuitry, in a control system, configured to:
      calculate at least a predicted transient bias force component expected upon arrival at a target track;
      control a read-write head during a seek period to move said read-write head substantially adjacent said target track; and
      initialize a track-following servo system to provide sufficient initial effective force on said read-write head to substantially counteract forces tending to move said read/write head off-track.

2. Apparatus, as claimed in claim 1, wherein said circuitry comprises a microprocessor, controlled by firmware.

3. Apparatus, as claimed in claim 1, wherein said circuitry is included in a data recording system comprising a hard disk drive.

4. Apparatus, as claimed in claim 1, wherein said forces tending to move said read/write head off-track also include a first bias force component.

5. Apparatus, as claimed in claim 4, wherein said circuitry is configure to substantially counteract the sum of at least said transient bias force component, plus said first bias force component, plus a repeatable runout component.

6. Apparatus, as claimed in claim 1, wherein said track-following servo system includes an integrator and wherein said circuitry is configured to provide said sufficient initial effective force by providing an initial value to said integrator.

7. Apparatus, as claimed in claim 6, wherein the value of said integrator is changed over at least a first period of time, wherein said first period of time occurs substantially during said seek period.

8. Apparatus, as claimed in claim 7, wherein the value of said integrator changes substantially as a linear function of time.

9. Apparatus, as claimed in claim 6, wherein said integrator value is changed for at least some seeks having a seek distance of one track.

10. Apparatus, as claimed in claim 6, wherein said integrator value is changed for at least some seeks having a seek distance sufficiently short that said transient bias forces are substantially determined by solid friction effects.

11. Apparatus, as claimed in claim 1, wherein, for at least some seeks, said circuitry calculates said transient bias force as a function of at least one of the group consisting of seek direction history, length of time since a seek of at least a first distance, or temperature.

12. Apparatus, as claimed in claim 1, wherein, for at least some seeks, said circuitry calculates said transient bias force as a function of seek distance.

13. Apparatus, as claimed in claim 12, wherein said function is a substantially linear function, for at least a first range of seek distances.

14. Apparatus, as claimed in claim 12, wherein said function is a substantially parabolic function, for at least a first range of seek distances.

15. Apparatus, as claimed in claim 14, wherein said circuitry is configured to determine a magnitude of said parabolic function.

16. Apparatus, as claimed in claim 14, wherein said circuitry is configured to determine a magnitude of said parabolic function for a predetermined seek distance.

17. Apparatus, as claimed in claim 16, wherein said predetermined seek distance is substantially the midpoint of said first range.

18. Apparatus, as claimed in claim 12, wherein said function is a substantially parabolic function, for at least a first range of seek distances, and is a substantially linear function, for at least a second range of seek distances.

19. Apparatus, as claimed in claim 18, wherein said function is a substantially constant function for said second range of seek distances.

20. Apparatus, as claimed in claim 19, wherein said circuitry is configured to determine a magnitude of said constant function.

21. Apparatus, as claimed in claim 18, wherein said first range and said second range are adjacent and wherein a boundary between said first range and said second range is at a boundary seek distance, and wherein said circuitry is configured to define at least one of said parabolic function and said linear function so that said parabolic function and said linear function intersect at said boundary seek length.

22. Apparatus, as claimed in claim 12, wherein said circuitry is configured to adjust said function in response to at least a first operating parameter of said data recording system.

23. Apparatus, as claimed in claim 22, wherein said first operating parameter is monitored during normal operation of said data recording system.

24. Apparatus, as claimed in claim 22, wherein said first operating parameter is a position error signal.

25. Apparatus, as claimed in claim 24, wherein a sequence of said position error signal is used to adjust said function only if said sequence occurs during a minimum length of on-track operation.

26. Apparatus, as claimed in claim 24, wherein a plurality of sequences of said position error signal are used in adjustment of said function, and wherein a given sequence of position error signals is one of said plurality of sequences only if said given sequence occurs following a seek in a direction which is not the same as the seek direction before an immediately preceding one of said plurality of sequences.

27. Apparatus, comprising:
circuitry, in a control system, configured to:
calculate at least a transient component of a bias force expected upon arrival at a target track using at least a first function;
control a read-write head during a seek period to move said read-write head substantially adjacent said target track;
initialize a track-following servo system to provide sufficient initial effective force on said read-write head to substantially counteract at least said transient bias force component; and
provide adaptation by adjusting said first function in response to at least a first operating parameter obtained during normal read-write operation of a data recording system.

28. Apparatus, as claimed in claim 27, wherein said circuitry comprises a microprocessor, controlled by firmware.

29. Apparatus, as claimed in claim 27, circuitry is included in a data recording system comprising a hard disk drive.

30. Apparatus, as claimed in claim 27, wherein said first operating parameter is monitored during normal operation of said data recording system.

31. Apparatus, as claimed in claim 27, wherein said first operating parameter is a position error signal.

32. Apparatus, as claimed in claim 31, wherein a sequence of said position error signal is used to adjust said first function only if said sequence occurs during a on-track operation having at least a predetermined minimum length.

33. Apparatus, as claimed in claim 31, wherein a plurality of sequences of said position error signal are used in adjustment of said first function, and wherein a given sequence of position error signals is one of said plurality of sequences only if said given sequence occurs following a seek in a direction which is not the same as the seek direction before an immediately preceding one of said plurality of sequences.

34. Apparatus, as claimed in claim 31, wherein said track-following servo system includes an integrator and wherein said circuitry is configured to provide said sufficient initial effective force by providing an initial value to said integrator.

35. Apparatus, as claimed in claim 34, wherein the value of said integrator is changed over at least a first period of time, wherein said first period of time occurs substantially during said seek period.

36. Apparatus, as claimed in claim 34, wherein the value of said integrator changes substantially as a linear function of time.

37. Apparatus, as claimed in claim 34, wherein said integrator value is changed for at least some seeks having a seek distance of one track.

38. Apparatus, as claimed in claim 34, wherein said integrator value is changed for at least some seeks having a seek distance sufficiently short such that said bias force component is substantially determined by solid friction effects.

39. Apparatus, as claimed in claim 27, wherein, for at least some seeks, said circuitry calculates said bias force component as a function of seek distance.

40. Apparatus, as claimed in claim 39, wherein said function is a substantially linear function, for at least a first range of seek distances.

41. Apparatus, as claimed in claim 39, wherein said function is a substantially parabolic function, for at least a first range of seek distances.

42. Apparatus, as claimed in claim 41, wherein said circuitry is configured to determine a magnitude of said parabolic function.

43. Apparatus, as claimed in claim 41, wherein said circuitry is configured to determine a magnitude of said parabolic function for a predetermined seek distance.

44. Apparatus, as claimed in claim 43, wherein said predetermined seek distance is substantially the midpoint of said first range.

45. Apparatus, as claimed in claim 39, wherein said function is a substantially parabolic function, for at least a first range of seek distances, and is a substantially linear function, for at least a second range of seek distances.

46. Apparatus, as claimed in claim 45, wherein said function is a substantially constant function for said second range of seek distances.

47. Apparatus, as claimed in claim 46, wherein said circuitry is configured to determine a magnitude of said constant function.

48. Apparatus, as claimed in claim 45, wherein said first range and said second range are adjacent and wherein a boundary between said first range and said second range is at a boundary seek distance, and wherein said circuitry is configured to define at least one of said parabolic function and said linear function so that said parabolic function and said linear function intersect at said boundary seek length.

49. Apparatus, as claimed in claim 27, wherein said read/write head is mounted on an arm and wherein said read write head is moved by rotating said arm about an arm rotation axis.

50. A method, comprising:
calculating at least a predicted transient bias force component expected upon arrival at a target track;
controlling a read-write head during a seek period to move said read-write head substantially adjacent said target track; and
initializing a track-following servo system to provide sufficient initial effective force on said read-write head to substantially counteract forces tending to move said read/write head off-track.

51. A method, as claimed in claim 50, wherein said forces tending to move said read/write head off-track include said transient bias force component.

52. A method, as claimed in claim 50, wherein said track-following servo system includes an integrator and wherein said step of initializing includes providing an initial value to said integrator.

53. A method, as claimed in claim 50, further comprising changing the value of said integrator over at least a first period of time, wherein said first period of time occurs substantially during said seek period.

54. A method, as claimed in claim 53, wherein said step of changing the value of said integrator comprises changing said value substantially as a linear function of time.

55. A method, as claimed in claim 50, wherein, said step of calculating comprises calculating said transient bias force as a function of seek distance, for at least some seeks.

56. A method, as claimed in claim 55, wherein said function is a substantially linear function, for at least a first range of seek distances.

57. A method, as claimed in claim 55, wherein said function is a substantially parabolic function, for at least a first range of seek distances.

58. A method, as claimed in claim 57, further comprising determining a magnitude of said parabolic function.

59. A method, as claimed in claim 57, further comprising determining a magnitude of said parabolic function for a predetermined seek distance.

60. A method, as claimed in claim 59, wherein said predetermined seek distance is substantially the midpoint of said first range.

61. A method, as claimed in claim 55, wherein said function is a substantially parabolic function, for at least a first range of seek distances, and is a substantially linear function, for at least a second range of seek distances.

62. A method, as claimed in claim 61, wherein said function is a substantially constant function for said second range of seek distances.

63. A method, as claimed in claim 62, further comprising determining a magnitude of said constant function.

64. A method, as claimed in claim 61, wherein said first range and said second range are adjacent and wherein a boundary between said first range and said second range is at a boundary seek distance, and further comprising defining at least one of said parabolic function and said linear function so that said parabolic function and said linear function intersect at said boundary seek length.

65. A method, as claimed in claim 55, further comprising adjusting said function in response to at least a first operating parameter of said data recording system.

66. A method, as claimed in claim 55, wherein said first operating parameter is monitored during normal operation of a data recording system.

67. A method, as claimed in claim 55, wherein said first operating parameter is a position error signal.

68. Apparatus, comprising:
means for receiving at least first read/write command information, including an indication of a target track;
means for calculating at least a component of a transient bias force using at least a first function;
means for controlling a read-write head during a seek period to move said read-write head substantially adjacent said target track;
means for providing sufficient initial effective force on said read-write head to substantially counteract at least said transient bias force component; and
means for adjusting said first function in response to at least a first operating parameter obtained during normal read-write operation of a data recording system.

69. Apparatus, as claimed in claim 68, wherein at least said means for calculating comprises a microprocessor, controlled by firmware.

70. Apparatus, as claimed in claim 68, wherein said means for calculating, said means for controlling, said means for providing and said means for adjusting comprise a microprocessor, controlled by firmware.

71. Apparatus, as claimed in claim 68, wherein said data recording system comprises a hard disk drive.

72. Apparatus, as claimed in claim 68, wherein said first operating parameter is monitored during normal operation of said data recording system.

73. Apparatus, as claimed in claim 68, wherein said first operating parameter is a position error signal.

74. Apparatus, as claimed in claim 73, wherein a sequence of said position error signal is used to adjust said first function only if said sequence occurs during a on-track operation having at least a predetermined minimum length.

75. Apparatus, as claimed in claim 73, wherein a plurality of sequences of said position error signal are used in adjustment of said first function, and wherein a given sequence of position error signals is one of said plurality of sequences only if said given sequence occurs following a seek in a direction which is not the same as the seek direction before an immediately preceding one of said plurality of sequences.

76. Apparatus, as claimed in claim 68, wherein said track-following servo system includes an integrator and wherein said means for providing comprises providing an initial value to said integrator.

77. Apparatus, as claimed in claim 76, further comprising means for changing the value in said integrator is changed over at least a first period of time, wherein said first period of time occurs substantially during said seek period.

78. Apparatus, as claimed in claim 77, wherein the value in said integrator changes substantially as a linear function of time.

79. Apparatus, as claimed in claim 68, wherein, said means for calculating comprises calculating said bias force component as a function of seek distance.

80. Apparatus, as claimed in claim 79, wherein said function is a substantially linear function, for at least a first range of seek distances.

81. Apparatus, as claimed in claim 79, wherein said function is a substantially parabolic function, for at least a first range of seek distances.

82. Apparatus, as claimed in claim 81, further comprising means for determining a magnitude of said parabolic function.

83. Apparatus, as claimed in claim 81, further comprising means for determining a magnitude of said parabolic function for a predetermined seek distance.

84. Apparatus, as claimed in claim 83, wherein said predetermined seek distance is substantially the midpoint of said first range.

85. Apparatus, as claimed in claim 79, wherein said function is a substantially parabolic function, for at least a first range of seek distances, and is a substantially linear function, for at least a second range of seek distances.

86. Apparatus, as claimed in claim 85, wherein said function is a substantially constant function for said second range of seek distances.

87. Apparatus, as claimed in claim 86, further comprising means for determining a magnitude of said constant function.

88. Apparatus, as claimed in claim 85, wherein said first range and said second range are adjacent and wherein a boundary between said first range and said second range is at a boundary seek distance, and further comprising means for defining at least one of said parabolic function and said linear function so that said parabolic function and said linear function intersect at said boundary seek length.

* * * * *